United States Patent [19]
Raso

[11] Patent Number: 5,366,003
[45] Date of Patent: Nov. 22, 1994

[54] AUTOMOTIVE AIR CONDITIONER COMPRESSOR CONTROLLER

[76] Inventor: Vito Raso, 2191 South Newark Way, Aurora, Colo. 80014

[21] Appl. No.: 25,938

[22] Filed: Mar. 3, 1993

[51] Int. Cl.⁵ ............................................. F25B 19/00
[52] U.S. Cl. ........................................ 165/2; 62/231; 165/12
[58] Field of Search ................... 236/46 R; 165/12, 2; 62/231, 323.4, 158

[56] References Cited

U.S. PATENT DOCUMENTS

| | | | |
|---|---|---|---|
| 4,136,730 | 1/1979 | Kinsey | 62/231 X |
| 4,144,930 | 3/1979 | Ferdelman | 62/231 X |
| 4,202,613 | 6/1980 | Shockley | 62/133 |
| 4,274,265 | 6/1981 | Okumura | 62/158 |
| 4,424,682 | 1/1984 | Miska et al. | 62/133 |
| 4,480,443 | 11/1984 | Nishi et al. | 62/227 |
| 4,481,784 | 11/1984 | Elmslie | 62/133 |
| 4,485,966 | 12/1984 | Cartmell et al. | 236/46 R |
| 4,733,540 | 3/1988 | Sakurai | 62/133 |
| 4,909,043 | 3/1990 | Massauji et al. | 62/158 |

Primary Examiner—William E. Wayner
Attorney, Agent, or Firm—William E. Hein

[57] ABSTRACT

A fuel-saving air conditioner compressor timer is adapted for simple connection to motor vehicle air conditioner systems of the type that are manually controlled and not of the expensive climate control type. An adjustable timer may be set by the driver by means of one or more front panel controls to repeatedly cycle the vehicle's air conditioner compressor on and off in order to take advantage of the thermal time constant of the air conditioner duct system, which results in the continuing flow of cool air therefrom for a period of time after the compresor is cycled off. The on and off cycling of the compressor is adjusted by the driver so that the compressor will cycle on when the temperature of the air flowing from the duct system rises to an uncomfortable level. An optional overriding temperature control, such as a thermostat, may be provided to prevent the compressor timer from engaging the compressor until the temperature inside the vehicle reaches a predetermined level.

4 Claims, 3 Drawing Sheets

AUTOMOTIVE AIR CONDITIONER COMPRESSOR CONTROLLER

BACKGROUND AND SUMMARY OF THE INVENTION

This invention relates generally to air conditioning systems employed in automobiles, trucks, tractors, motor homes, and other vehicles and more particularly to manually controlled air conditioning systems that do not utilize an automatic temperature control, commonly referred to as a climate control system.

It has been established that a considerable amount of fuel is wasted in vehicles that are not equipped with a climate control system because the air conditioner compressor is engaged 100% of the time. The temperature inside the vehicle can only be increased by manually adjusting the temperature lever to a higher setting, which causes warm air from the heater to be mixed with cold air from the air conditioner, while the air conditioner compressor is engaged full time. Testing has shown that the heat sink capability or thermal time constant of the vehicle air ducts results in circulation of cool inside air for several minutes after the air conditioner compressor has been turned off before the inside air temperature has risen to the point at which operation of the compressor is again required. Since operation of the air conditioner compressor represents a substantial incremental load on the engine of a small vehicle, a significant fuel saving can be realized when the compressor is not engaged.

Several prior art references are directed to timing control of manually operated vehicle air conditioning systems. U.S. Pat. No. 4,202,613 to Schockley is directed to an air conditioner control system that serves to prevent engagement of the compressor for a given fixed period of time immediately after starting the vehicle engine and during periods of vehicle acceleration. U.S. Pat. No. 4,274,265 to Okumura is directed to an apparatus that enables operation of a vehicle cooling and heating system at a preset time and only when the temperature inside the vehicle is outside a suitable range, as compared with a preset temperature. U.S. Pat. No. 4,424,682 to Miska et al. is directed to a vehicle air conditioning compressor control system that prevents cycling of the compressor when the vehicle speed falls below a predetermined limit. U.S. Pat. No. 4,480,443 to Nishi et al. is directed to an automotive refrigeration system in which the displacement of a variable displacement compressor is controlled to be in a minimum position at the time the compressor is engaged to thereby prevent frosting or icing on the fins of the evaporator. U.S. Pat. No. 4,481,784 to Elmslie is directed to an automotive air conditioner control system in which the normal cycling of the compressor is inhibited during engine idle conditions so that the compressor remains either continuously on or continuously off, U.S. Pat. No. 4,733,540 to Sakurai is directed to a control system for a vehicular air conditioner compressor that operates to disengage the compressor for a period of time following abrupt vehicle acceleration or following detection of a fuel system overheat condition. U.S. Pat. No. 4,909,043 to Masauji et al. is directed to an air conditioning control system for automotive vehicles in which a variable capacity compressor is controlled to perform cool-down control with the compressor set to full capacity, irrespective of the cooling degree of the evaporator, to thereby prevent freeze-up of the evaporator, It is therefore the principal object of the present invention to provide an air conditioner compressor controller, for use with less expensive vehicle air conditioner systems that do not employ climate control, for repeatedly cycling the compressor on and off in a predetermined, but adjustable, manner to thereby effect significant fuel savings.

This and other objects are accomplished in accordance with the illustrated preferred embodiment of the present invention by employing an adjustable timer to repeatedly cycle the compressor on and off. The timer is adjustable by the driver to compensate for changes in outside air temperature and the effect on the inside temperature of the vehicle produced by the sun. A thermostat may be employed in combination with the adjustable timer to provide overriding adjustable temperature control to prevent the timer from engaging the compressor until the temperature inside the vehicle rises to a predetermined level. The adjustable timer of the present invention may be very simply added to existing automobile air conditioning systems.

DETAILED DESCRIPTION OF THE PREFERRED EMBODIMENTS

Figure 1:
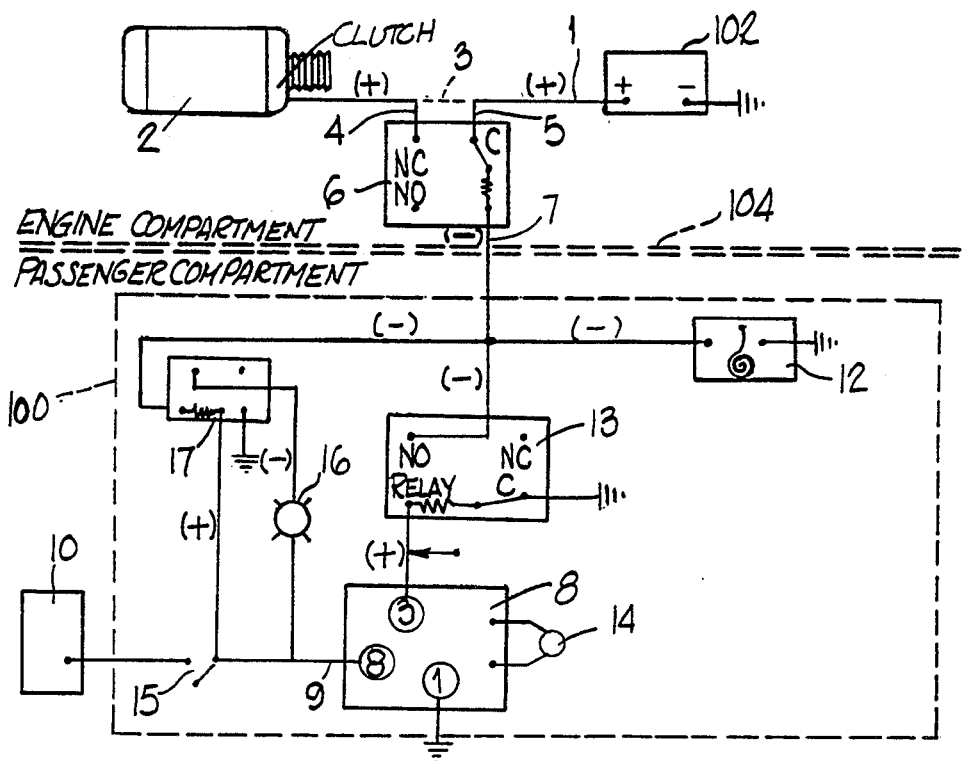
FIG. 1 is a schematic diagram illustrating how the automotive air conditioner compressor controller of the present invention is simply interfaced to a conventional automotive air conditioning system.
Figure 2A:
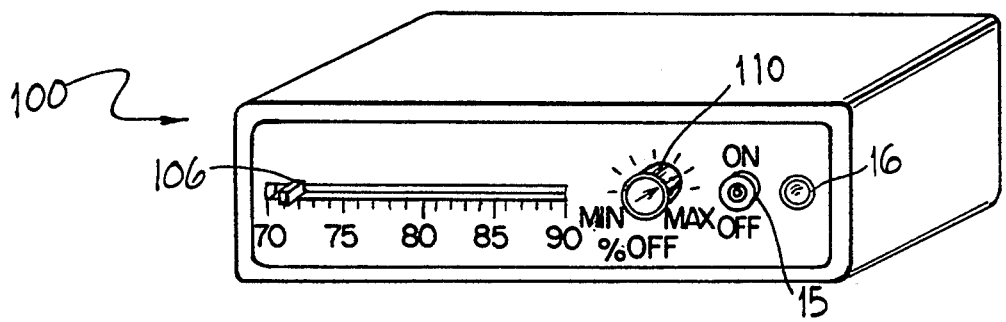
FIGS. 2A and 2B are pictorial diagrams illustrating alternative front panel control layouts for the automotive air conditioner compressor controller of FIG. 1.
Figure 2B:
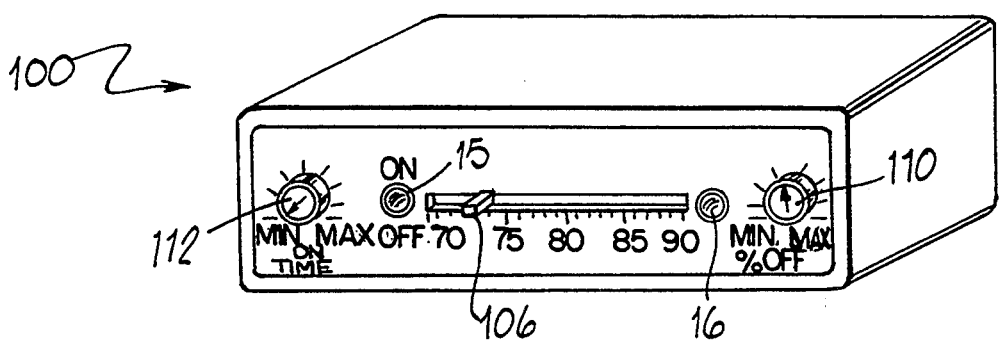
Figure 3:
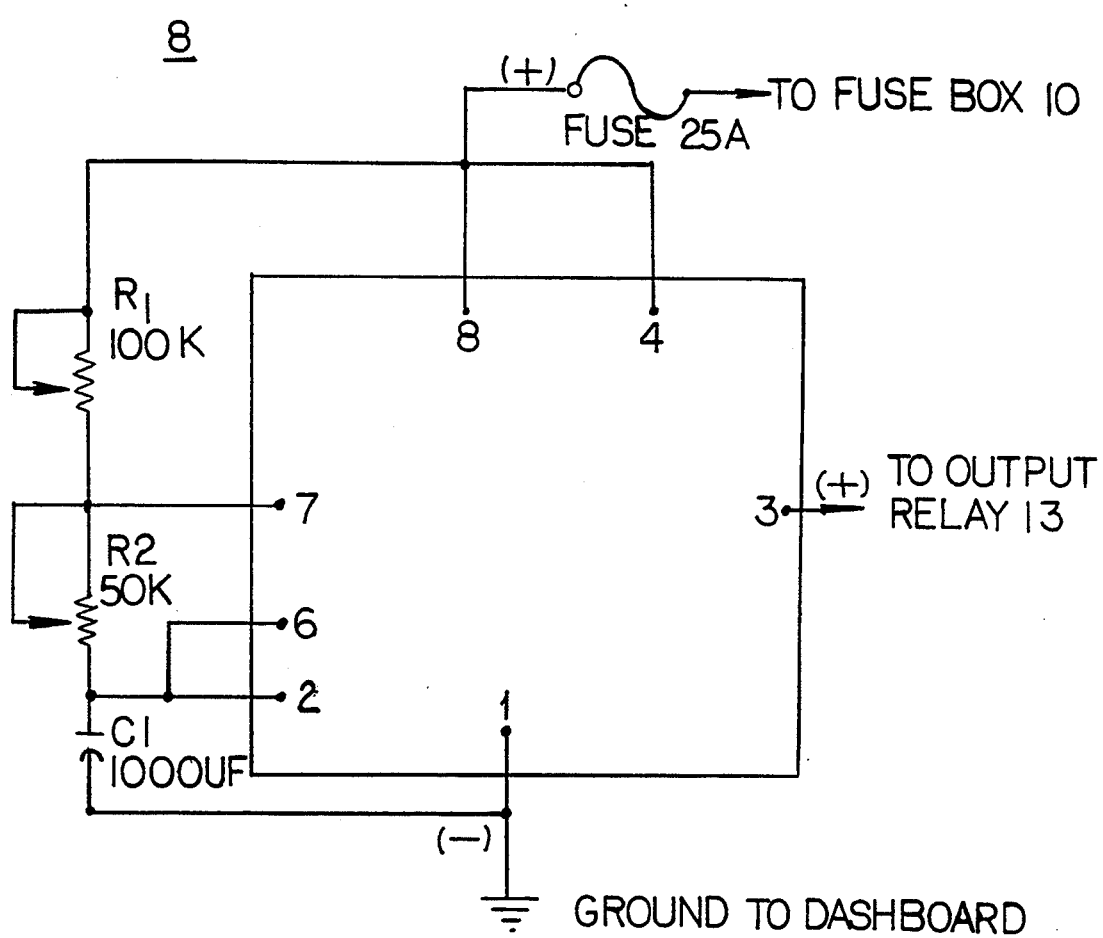
FIG. 3 is a detailed schematic diagram of the timer employed in the automotive air conditioner compressor controller of FIGS. 1 and 2A–B.
Figure 4:
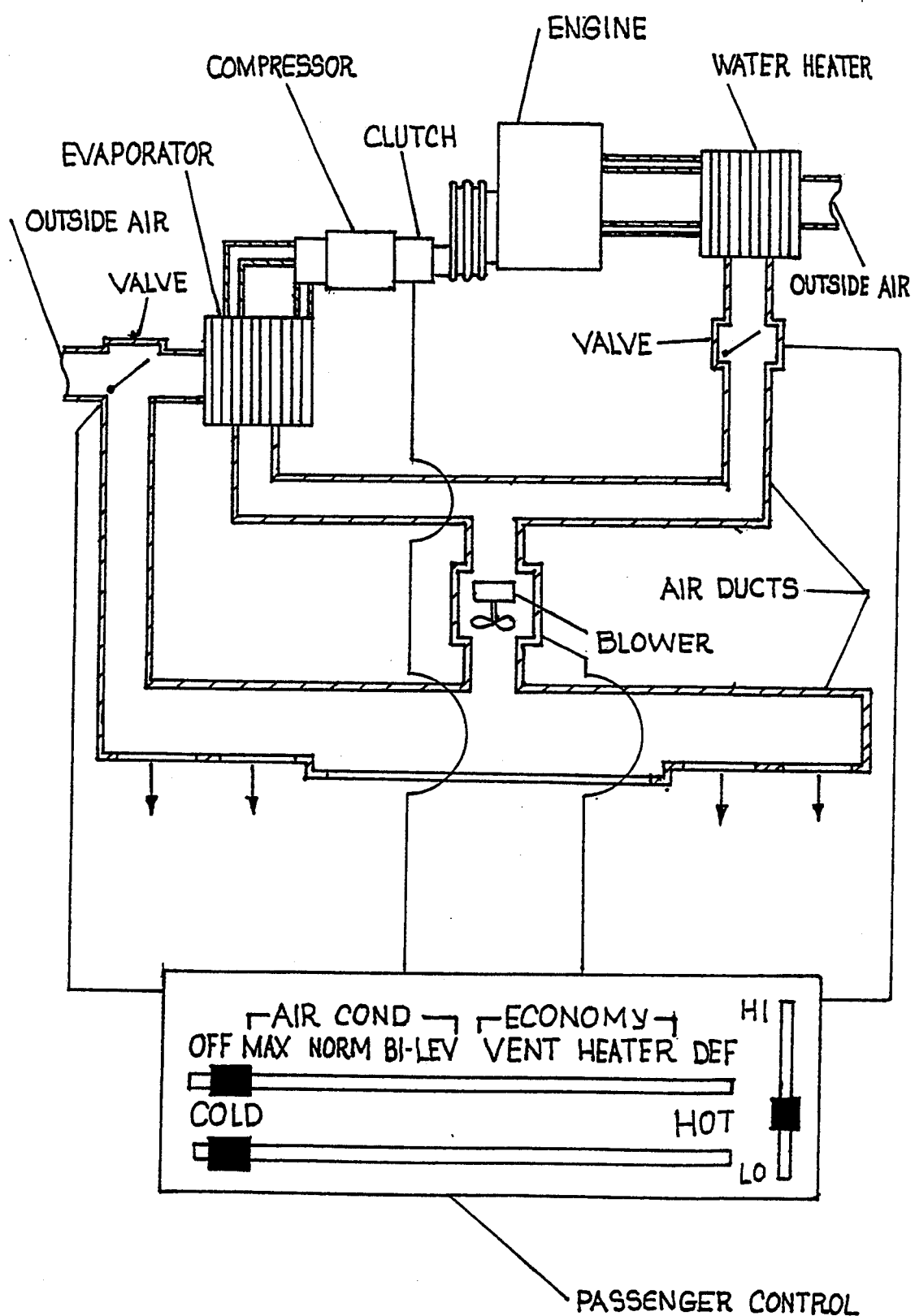
FIG. 4 is a pictorial diagram of a prior art automotive air conditioner system of the conventional type that is manually regulated to effect a desired mixing of cold air produced by a refrigerant compressor and hot air produced by a water heater.

Referring now to FIGS. 1–3 and to the prior art drawing of FIG. 4, there is shown an automotive air conditioner compressor controller 100 that is connected to a conventional automotive air conditioning system by splicing, at point 3, a single positive electrical line that typically connects the vehicle battery 102 to the clutch of compressor 2. Spliced ends 4, 5 of the positive electrical line are connected to a relay 6 that is positioned in close proximity to the splice 3. A line 7, from relay 6, is routed through the vehicle firewall 104 into the passenger compartment, where it is connected to the compressor controller 100. Compressor controller 100 may be packaged as illustrated in FIGS. 2A–B and mounted in any convenient location in the passenger compartment of the vehicle that provides access to its front panel controls. Compressor controller 100 includes a timer 8 that is powered by connection to the vehicle fuse box 10. An optional temperature control 12, that may comprise any of a number of off-the-shelf thermostats, for example, may be included within compressor control let 100. Relay 6 is connected so that power flows through it until line 7 is grounded. This is accomplished when temperature control 12 closes as the result of the temperature inside the vehicle falling to a level that is adjustable from a front panel knob 106 that forms part of temperature control 12. Whenever temperature control 12 is open, the clutch on compressor 2 will remain engaged unless a positive output signal is received from timer 8 to switch relay 13 to its closed position. The period of time during which it is desired that compressor 2 be turned off or not engaged may be adjusted by means of a potentiometer 14 that is connected to timer 8. In the detailed schematic diagram of FIG. 3, in which an off-the-shelf 555 integrated circuit is employed as timer 8 of FIG. 1, resistor R1 may be variable and resistor R2 fixed, in which case compressor 2 is controlled to have a fixed on time and a variable off time, set by knob 110 illustrated in FIG. 2A. Alternatively, both the on time and off time of compressor 2 may be separately controlled by knobs 110 and 112 illustrated in FIG. 2B. In this case, both resistors R1 and R2 of FIG. 3 are variable. Resistor R1 controls the off time of compressor 2, while resistor R2 controls its on time. An optional power switch 15 provides on/off control of compressor controller 100, and an indicator lamp 16, connected to a relay 17, provides a visual indication to the driver during the time that compressor 2 is engaged.

In the detailed schematic diagram of FIG. 3, the off time T2 of compressor 2 is given by the expression T2: 0.693(R2)(C1), and the on time T1 of compressor 2 is given by the expression T1: 0.693(R1+R2)(C1). The frequency F at which compressor 2 is cycled is given by the expression F=1.44/(R1+2R2)(C1).

In operation, the air conditioner compressor controller 100 of the present invention acts to permit the driver of the vehicle to adjust the on/off time cycle of compressor 2 by setting front panel control knob 110 in the embodiment of FIG. 2A or by setting both front panel control knobs 110 and 112 in the embodiment of FIG. 2B. As stated above, cool air will continue to flow from the air conditioner ducts of the vehicle for a period of time after compressor 2 is turned off, due to the thermal time constant of those ducts. As the temperature of the air flowing from the ducts continues to rise, the compressor 2 will be turned on in accordance with the selected on/off time cycle to create a new flow of cool air. This on/off time cycle will be repeated until either of control knobs 110, 112 is changed. Of course, as explained above, the temperature set by control knob 106 will override the on/off time cycle determined by the settings of control knobs 110, 112 in order to maintain a selected inside air temperature.

I claim:

1. An automotive air conditioner system employing a continuously operating engine-driven refrigerant compressor, heater, and blower, but not employing a temperature sensor for sensing an inside temperature, said automotive air conditioner system being of the type that is manually regulated to effect a desired mixing of cold air form the refrigerant compressor and hot air from the heater, the improvement comprising adjustable timer means coupled to the refrigerant compressor for repeatedly cycling the refrigerant compressor on and off in accordance with a timed duty cycle that is adjustable by the user.

2. An automotive air conditioner system as in claim 1 wherein said adjustable timer means comprises an electronic timer integrated circuit employing one or more potentiometers for enabling the user to set said timed duty cycle.

3. An automotive air conditioner system as in claim 1, further comprising:
    power switch means for turning said adjustable timer means on and off; and
    visual indicator means for providing a visual indication to the user during the time that said refrigerant compressor is cycled on.

4. A method of operating an automotive air conditioner system that employs a continuously operating engine-driven refrigerant compressor, heater, and blower, but not employing a temperature sensor for sensing an inside temperature, the air conditioner system being of the type that is manually regulated to effect a desired mixing of cold air from the refrigerant compressor and hot air from the heater, the method comprising repeatedly cycling the refrigerant compressor on and off in accordance with a timed duty cycle of an adjustable timer that is adjustable by the user.

* * * * *